US012469626B2

(12) United States Patent
Calvert

(10) Patent No.: US 12,469,626 B2
(45) Date of Patent: Nov. 11, 2025

(54) METHODS OF MANUFACTURING A MOLDED, FORMERLESS MULTI-COIL CYLINDRICAL SUPERCONDUCTING MAGNET STRUCTURE, AND A STRUCTURE AS MAY BE MANUFACTURED BY SUCH METHODS

(71) Applicant: Siemens Healthcare Limited, Camberley (GB)

(72) Inventor: Simon James Calvert, Chipping Norton (GB)

(73) Assignee: Siemens Healthcare Limited, Camberley (GB)

( * ) Notice: Subject to any disclaimer, the term of this patent is extended or adjusted under 35 U.S.C. 154(b) by 659 days.

(21) Appl. No.: 17/950,967

(22) Filed: Sep. 22, 2022

(65) Prior Publication Data

US 2023/0091475 A1 Mar. 23, 2023

(30) Foreign Application Priority Data

Sep. 23, 2021 (GB) ...................................... 2113578

(51) Int. Cl.

*H01F 6/06* (2006.01)
*H01F 27/32* (2006.01)
*H01F 41/00* (2006.01)
*H01F 41/098* (2016.01)

(52) U.S. Cl.

CPC ............. *H01F 6/06* (2013.01); *H01F 27/327* (2013.01); *H01F 41/005* (2013.01); *H01F 41/098* (2016.01)

(58) Field of Classification Search

CPC ........ H01F 41/005; H01F 6/06; H01F 27/327; H01F 41/098; H01F 41/127; H01F 41/082; H01F 41/048

See application file for complete search history.

(56) References Cited

U.S. PATENT DOCUMENTS

| | | | | |
|---|---|---|---|---|
| 8,013,697 B2 * | 9/2011 | Calvert | G01R 33/421 335/282 |
| 2004/0178871 A1 * | 9/2004 | Elgin, II | H01F 6/06 335/216 |
| 2013/0176090 A1 | 7/2013 | Calvert et al. | |

FOREIGN PATENT DOCUMENTS

| | | | |
|---|---|---|---|
| GB | 2487925 A | 8/2012 | |
| GB | 2519811 A | 5/2015 | |
| WO | WO-2012123711 A1 * | 9/2012 | H01F 41/048 |

* cited by examiner

*Primary Examiner* — Mohamad A Musleh

(74) *Attorney, Agent, or Firm* — Banner & Witcoff Ltd.

(57) ABSTRACT

A method for the manufacture of a formerless, multi-coil cylindrical superconducting magnet structure is disclosed. The structure comprises superconducting coils and annular spacers of composite filler material. The disclosure also provides a formerless, multi-coil cylindrical superconducting magnet structure as may be manufactured by such a method.

12 Claims, 5 Drawing Sheets

METHODS OF MANUFACTURING A MOLDED, FORMERLESS MULTI-COIL CYLINDRICAL SUPERCONDUCTING MAGNET STRUCTURE, AND A STRUCTURE AS MAY BE MANUFACTURED BY SUCH METHODS

CROSS-REFERENCE TO RELATED APPLICATIONS

The present application claims priority to and the benefit of United Kingdom patent application no. GB 2113578.5, filed on Sep. 23, 2021, the contents of which are incorporated herein by reference in its entirety.

TECHNICAL FIELD

The present disclosure relates to methods of manufacturing "formerless" multi-coil cylindrical superconducting magnets, and to cylindrical superconducting magnets as may be manufactured by such methods. Such magnets may be employed as a main magnetic field generator in a magnetic resonance imaging (MRI) system.

BACKGROUND

Conventionally, cylindrical superconducting magnets have been manufactured with formers; or with external sleeves. Recent formerless magnets, composed of alternating annular coils and annular spacers, are known, but are manufactured by complex, expensive, and potentially unreliable manufacturing methods. The present disclosure aims to provide simpler and more reliable manufacturing methods for formerless cylindrical superconducting magnets, and to provide improved formerless cylindrical superconducting magnets as may be manufactured by such methods.

SUMMARY

Aluminum or composite material formers are commonly used on "wet" magnets, i.e. those cooled by direct contact with a liquid cryogen, and "dry" magnets, i.e. those not cooled by direct contact with a liquid cryogen. Superconducting wire is wound onto a former, and can be left unimpregnated or be impregnated with wax or epoxy resin, for example. While such use of a former gives good precision in coil size, shape, and position, the formers are expensive and necessarily occupy space on the radially-inner surface of the coils, increasing the required diameter of the coils and moving the coils away from the imaging volume. Bearing in mind the required geometry of the coil layout, an increase in diameter of the coils carries with it a need for increased axial spacing between the coils. These effects increase the wire cost and the overall length of the magnet.

Externally sleeved coils have been employed in which solenoids have external machined sleeves to constrain them and to reduce hoop stress. However, this approach may be found unsuitable for clinical MRI magnets due to increased cost.

Certain formerless coils are known, and may for example be known as "serially bonded magnets" or "SBM." SBM magnets can be assembled using individual coils stacked with annular spacers, but such methods require a long manufacturing time, and manufacturing tolerances stack up in the magnet assembly, making this approach potentially unsuitable for high-volume manufactured magnets.

The present disclosure accordingly seeks to provide methods of manufacturing formerless, multi-coil, cylindrical superconducting magnets that are simpler and more precise than known methods, and may be employed at reduced cost as compared to known methods. The present disclosure also provides formerless, multi-coil, cylindrical superconducting magnets as may be produced by such methods.

The present disclosure aims to provide a parallel SBM magnet, i.e. one with a constant or approximately constant inner diameter. This may be achieved by use of a mandrel that has parallel walls, or walls which are slightly tapered to aid mandrel extraction. The inner diameter of individual coils can be slightly increased while maintaining the constant or slightly tapered inner diameter of the structure as a whole by adding layers of glass fiber cloth, or similar, onto the mandrel before the coil is wound. This may be required to achieve the required homogeneity while optimizing the amount of wire required. More details of this optional arrangement are provided below with respect to the description of FIG. 9.

BRIEF DESCRIPTION OF THE DRAWINGS

The above and further objects, characteristics, and advantages of the present disclosure will become more apparent from the following discussion of certain embodiments thereof, given by way of non-limiting examples, in conjunction with the accompanying drawings, wherein.

DETAILED DESCRIPTION OF THE DISCLOSURE

Figure 1:
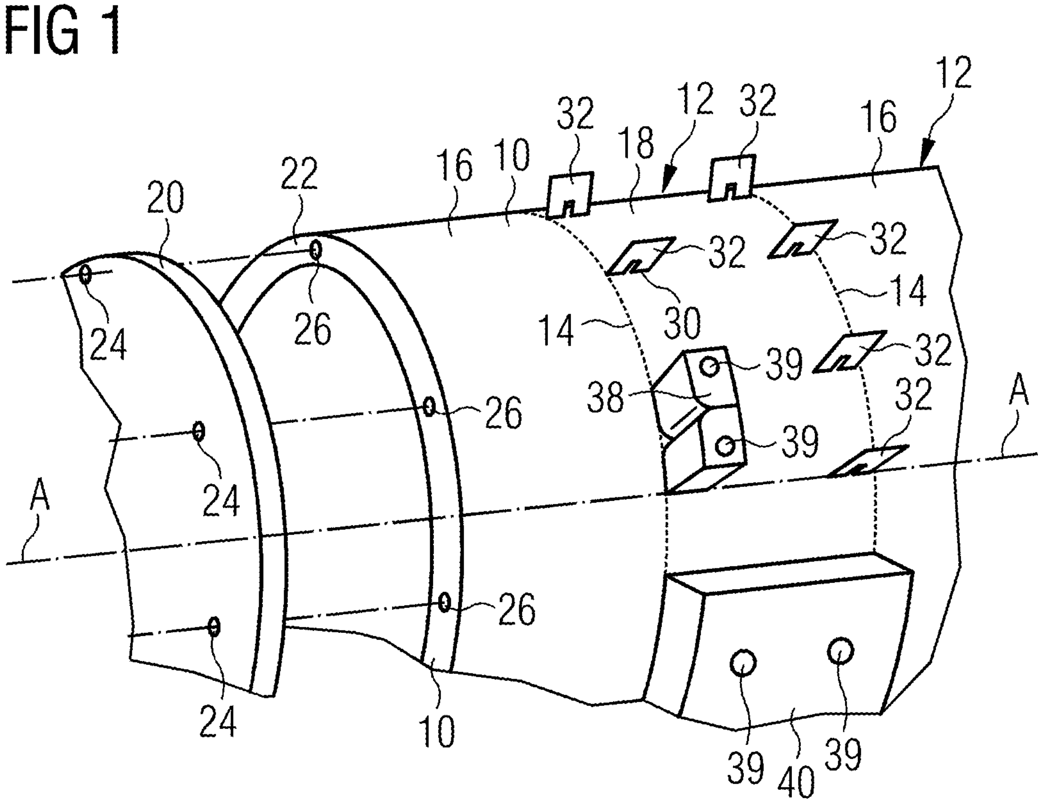
FIG. 1 illustrates an example mandrel being prepared for winding of superconducting wire onto its radially outer surface, in accordance with one or more embodiments of the present disclosure.

FIG. 1 illustrates a mandrel 10 being prepared for winding of superconducting wire onto its radially outer surface 12. The radially outer surface 12 is rotationally symmetrical about axis A-A and is essentially cylindrical, having parallel sides. However, radially outer surface 12 may have any suitable slight axial taper, for example 0.5 degrees, no more than 1 degree, etc., to assist with removal of a completed superconducting magnet coil assembly therefrom, as will be described below. The radially outer surface 12 may be coated with a release material such as polytetrafluoroethylene (PTFE).

Circumferential lines 14 as shown in phantom notionally divide the radially outer surface 12 of mandrel 10 into axial sections 16, 18 respectively configured to carry superconducting coils; and annular spacers of composite filler material. An end plate 20 is partially shown, and will be attached to an axial end 22 of the mandrel 10. Fixing holes 24 are shown, and fixings such as bolts may pass through the fixing holes 24 in the end plate 20 into tapped holes 26 in mandrel 10 to hold the pieces together as required. Other arrangements for attaching the end plate 20 may, of course, be used instead. A compression seal 21 (FIG. 3) may be used to provide a resin-tight joint between mandrel 10 and end plate 20. An outer radius of the end plate 20 is larger than an outer radius of the mandrel 10, as more clearly shown in FIG. 3. At each axial extremity of each region 18, recesses 30 are formed in the radially outer surface 12 of the mandrel. The recesses 30 are sized and shaped to retain tabs 32. Tabs 32 are more clearly illustrated in FIGS. 2, 4.

Figure 2:
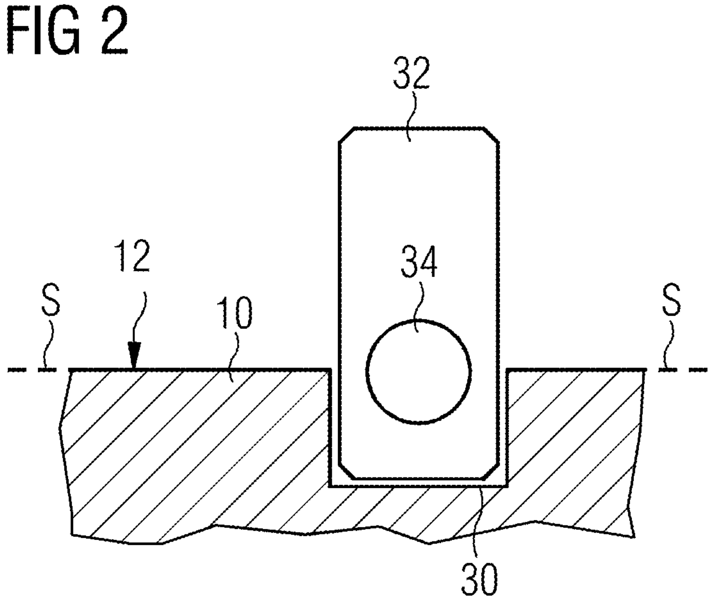
FIG. 2 illustrates example friable tabs as may be used in a method, in accordance with one or more embodiments of the present disclosure.

FIG. 2 shows a clearer illustration of tabs 32. The tabs 32 are essentially rectangular pieces of a friable sheet material, which may be a plastic. The tabs 32 are temporary locating features, and other structures may be used as temporary locating features, as will be described below in respect to other embodiments of the present disclosure. In the thickness direction t (see FIG. 4), as shown being the circumferential direction, the tabs 32 may be any suitable thickness, e.g. approximately 2-6 mm thick. In the axial direction, a, when installed as shown, the tabs 32 may have any suitable dimension, e.g. of 20-50 mm; in the radial direction, the tabs 32 may e.g. extend radially away from the radially outer surface 12 of mandrel 10 by a distance approximately equal to an intended radial dimension of the superconducting coils 50 to be formed. An alternative solution to the friable tabs 32 shown includes friable pins of hollow cylinders with notches aligned with shear plane S-S to ensure that the friable tabs fracture close to the inner radius of the coils. In an example, recesses 30 may be e.g. 10-20 mm deep, and the coils may have an intended radial dimension in the range of e.g. 50-150 mm. The tabs 32 are intended to be friable, in particular, the tabs 32 are configured to fracture at shear plane S-S, which approximately corresponds to the radially outer surface 12 of the mandrel 10. To assist in the friability at the shear plane, as illustrated, each tab 32 may be provided with a hole 34 or other stress-raising feature, corresponding to the location of the shear plane S-S, to improve friability of the tab. The tabs 32 may be comprised e.g. of a material that provides the required mechanical strength for their purpose in the manufacturing of the coil assembly, as further described below, but which will fracture under forces used to remove a completed coil assembly from the mandrel 10. The material chosen for tabs 32 or alternatives such as pins or hollow cylinders should not produce shards when fracturing. Examples of suitable materials for tabs 32 or alternatives include glass filled nylon or other suitable plastic materials, which can be injection molded cost effectively. As well as the hole 34 shown in the FIG. 2, a sharp notch may additionally or alternatively be included to ensure that the tab 32 or equivalent component fails at the correct point during mandrel extraction.

FIG. 1 illustrates mandrel 10 at a certain stage in a method of an embodiment of the present disclosure, where the mandrel 10 is being prepared for winding of superconducting wire to form coils.

Tabs 32 are located in recesses 30, and define axial extremities of regions 18 aligned with circumferential lines 14, defining axial sections configured to carry respective annular spacers. Also shown, and optionally taking the place of one or more tabs 32, is a lead-out block 38. This may be a single piece, or may take the form of two separate pieces. In either case, lead-out block 38 is retained against the radially outer surface 12 of the mandrel 10 by friable pins 39, or similar, having similar characteristics of friability as the tabs 32 discussed above. In a later stage of the method of this embodiment of the disclosure, superconducting wire is wound in regions 16 to form coils 50. Respective ends of the wire are passed through the lead-out block 38, which provides access to a radially inner extremity of the resulting coil and prevents potentially damaging sharp bends from forming in the wire as the wire enters and exits the coil region 16.

A displacer block 40 is partially illustrated. As shown, this displacer block 40 is attached to the radially outer surface 12 of the mandrel 10 over a circumferential extent, and an axial extent which does not extend outside of a spacer region 18. The displacer block 40 may have any suitable radial thickness, e.g. no greater than a planned radial thickness of adjacent superconducting coils 50 to be formed. The displacer block 40 may be retained against the radially outer surface 12 of the mandrel 10 by friable pins 39, or similar, having similar characteristics of friability as the tabs 32 discussed above. The purpose of the displacer block 40 is to reduce the amount of filler material required to form spacers in spacer regions 18 and to provide an amount of mechanical flexibility to the resulting superconducting coil structure. The use of such displacer blocks 40 is optional. When used, several displacer blocks 40 may be provided within each spacer region 18. However, the use of the displacer blocks 40 should not be so extensive so as to reduce the mechanical integrity of the magnet coil assembly as a whole.

In embodiments, the displacer blocks 40 extend the radial extent of the final magnet coil assembly, resulting in through-holes in the final assembly, such through-holes essentially having the dimensions of the displacer blocks 40. The resulting magnet coil assembly will comprise annular coil regions, axially separated and joined by respective intermittent spacer regions 18. In an alternative embodiment, during a later resin-impregnation step, a molding tool may be provided with at least one displacer block on a radially inner surface thereof, which may have an equivalent effect. In a further alternative, displacer blocks each of radial thickness a part of the radial thickness of the superconducting coils 50 may be provided in corresponding locations on the radially outer surface 12 of the mandrel, and on a radially inner surface of a molding tool so that between these, a hole in the final resin-impregnated superconducting coil structure is formed.

Figure 3:
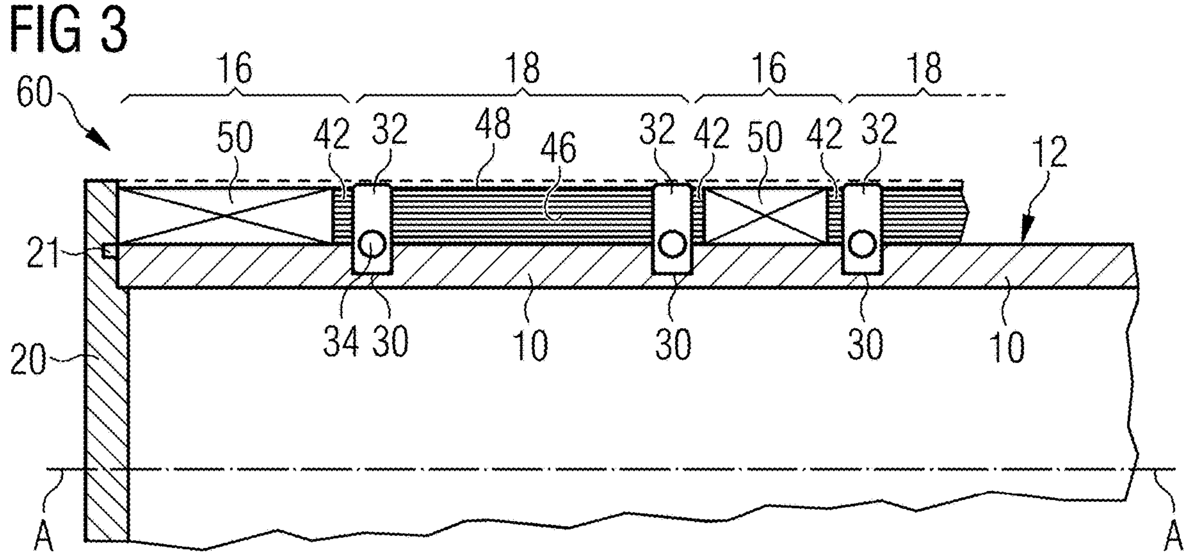
FIG. 3 illustrates an example stage where winding cheeks have been provided, in accordance with one or more embodiments of the present disclosure.
Figure 4:
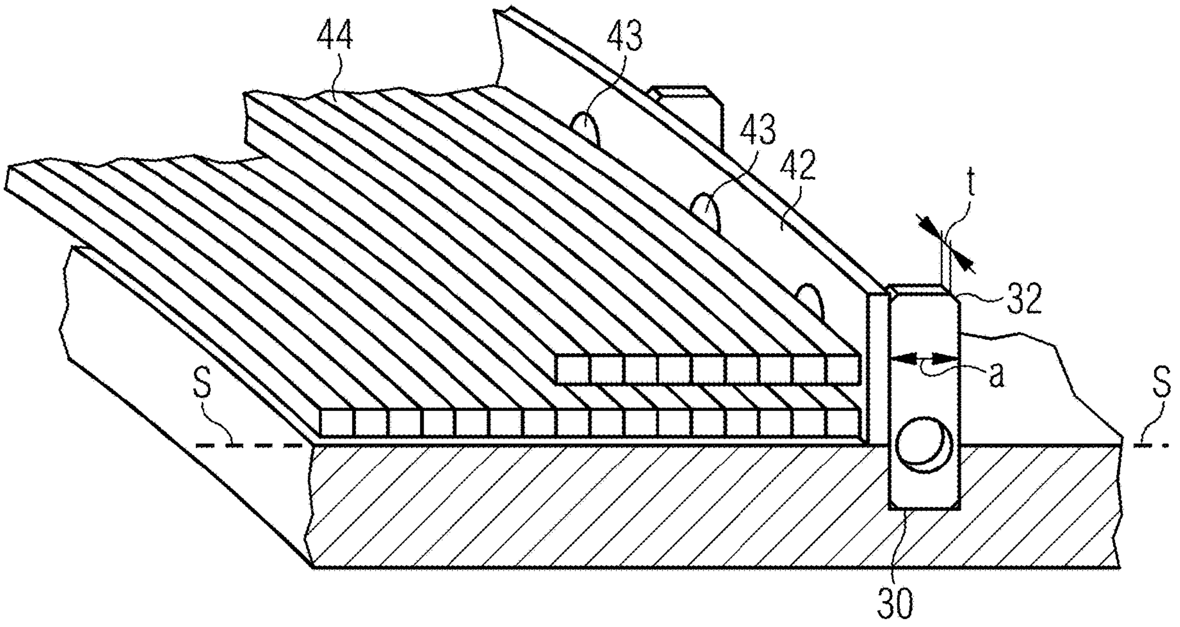
FIG. 4 illustrates an example coil winding step in which layers of wire are wound to form the coil, in accordance with one or more embodiments of the present disclosure.

FIGS. 3, 4 show later stages in a method of the present disclosure. Here, winding cheeks 42 have been provided, supported axially by tabs 32 or equivalent. The winding cheeks are an optional component which will improve the accuracy of the coil dimensions. As more clearly shown in FIG. 4, the winding cheeks 42 provide a continuous or near-continuous surface to define axial extremities of a winding cavity, into which the superconducting wire 44 is wound, to form respective superconducting coils 50. The winding cheeks 42 may be of a composite material such as Glass-Reinforced Plastic (GRP) or other suitable plastic injection molded material that is low-cost and structurally stable over the range of temperatures and pressures that the winding cheeks 42 are to be subjected to. The winding cheeks may be formed as complete annuli and slid onto the mandrel 10; alternatively, the winding cheeks 42 may be formed as arcs and assembled together circumferentially around the radially outer surface 12 of the mandrel 10. When composed of several arcs, the arcs need to be retained in position, for example by attachment to one another or to tabs 32 until the coils 50 have been wound or at least partially wound. During the winding of the coils 50, layers of wire 44 press against winding cheeks 42, where provided, and further retain the winding cheeks 42 in position against tabs 32 or equivalent.

In the example of FIG. 4, the winding cheeks 42 are provided with perforations 43 to allow a later flow of resin through the spaces 88 during a later impregnation step.

In other embodiments, no winding cheeks 42 are provided, and the superconducting wire 44 is wound into coils 50 defined and retained by tabs 32 or equivalent such as friable shear pins or cylinders.

Axial sections 16 are thereby filled, or at least substantially filled, with coils 50 wound of superconducting wire 44. Similarly, axial sections 18 are filled with a filler material. In the example shown in FIG. 3, this may be achieved by winding strips of filler cloth 46 around the mandrel 10 into axial sections 18, between tabs 32. Other methods may be used for filling axial sections 18, as will be discussed further below.

A release cloth layer 48 may be wound over the coils 50 and any wound filler cloth 46. The release cloth layer 48 may be of a material conventionally used for such purposes, such as a glass fiber cloth coated in polytetrafluoroethylene (PTFE). The release cloth serves to define a boundary within which will become part of the structure of the final superconducting magnet assembly, and outside of which any impregnating resin will be removed in a cleaning step as part of the manufacturing process.

The resultant structure 60 as partially illustrated in FIG. 3 may be impregnated with resin as is conventional in itself.

Figure 5:
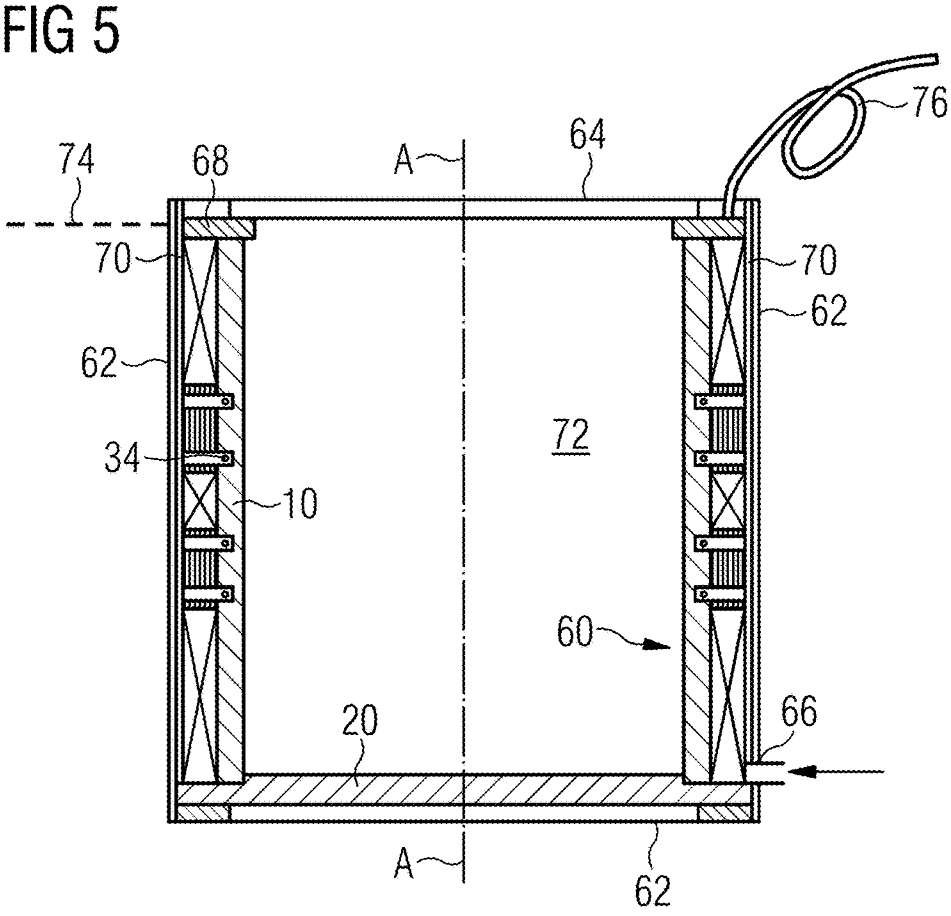
FIG. 5 illustrates a step in an example impregnation method, in accordance with one or more embodiments of the present disclosure.

FIG. 5 illustrates a step in an example impregnation method, which may be employed in a method of the present disclosure. Structure 60, such as illustrated in FIG. 3, is placed within an open-topped cylindrical trough 62. In the illustrated arrangement, a complete end plate 20 is provided at one axial end of the mandrel, while an alternative, annular end plate 68 is employed at the other axial end of the mandrel 10. The wall of the trough 62 is used as an outer molding tool and is profiled to a shape sufficient to accommodate the structure 60.

A lid 64 may be provided to seal the top of the trough. A resin inlet port 66 is provided to allow impregnating resin to be introduced into the trough 62. The mandrel 10 and end plate 20 may be used to define radially inner and lower limits of a cavity 70 for filling with resin. This will require the mandrel, the end plate, and the seal between the mandrel and the end plate to be resin-tight. In such an embodiment, no resin will enter the axial bore 72 of the mandrel. Alternatively, in use both cavity 70, radially outside of the mandrel 10, and axial bore 72 of the mandrel 10, may fill with resin. As is general known, resin may be introduced under gravity, by a pump such as a peristaltic pump or e.g. via a vacuum, is drawn within the trough 62 within at least cavity 70, and resin is drawn through port 66 to impregnate the magnet structure 60. In any case, resin is introduced into the trough 62 until the resin reaches a fill level 74 which is at least sufficient to immerse all coils 50 in the resin. The resin is then caused or allowed to cure at least into a gel state, and the resulting impregnated structure 60 is then removed from the trough 62.

The structure 60 may be removed from the trough 62, or the trough 62 may be removed in sections from the structure 60. A conventional clean-up operation may then be performed, including removal of any resin radially outside of the release layer 48.

In an embodiment, ends 76 of wires forming the coils 50 are led out from coils 50 in one or more cavities formed within a wall of trough 62, so that the ends 76 are retained within a resin block, monolithically formed with the resultant resin-impregnated superconducting magnet structure. This ensures that all ends are securely held in position with respect to coils 50, and avoids the need for otherwise-complex wire retaining procedures conventionally employed. Such an arrangement may provide excellent mechanical and thermal stabilization to the ends 76 of the superconducting leads. The leads will exit at the upper end of the coil assembly during impregnation so little post-impregnation lead clean-up will be required.

In alternative embodiments, filler cloth 46 is not provided in axial regions 18 of the structure 60. Rather, coils 50 are wound into axial regions 16, but axial regions 18 are left substantially empty. In such an embodiment, the resultant structure is placed into trough 62, similar to the arrangement of FIG. 6, but then dry loose filler material, such as dry glass spheres, sand, alumina, or other suitable thermally-stable low-cost material is introduced into the trough along with the structure 60. The dry loose filler material should be introduced up to a fill level similar to resin fill level 74 shown in FIG. 6. The dry loose filler material will occupy the space between mandrel 10 and trough 62, particularly in the axial regions 18. In an embodiment in which axial regions 18 are filled with such dry loose filler, it will not be possible to provide a release cloth layer 48 over the filler material. A release cloth layer 48 may still be provided over the coils 50 to remove any excess resin and filler material deposited radially outside of the coils 50 during the impregnation process.

Once the dry loose filler material has been introduced up to about fill level 74 (e.g. within 1%, 5%, 10%, etc.), resin is introduced at least into cavity 70, either under gravity or by using a pump such as a peristaltic pump, drawn by a vacuum, etc. The resin is then caused or allowed to cure at least into a gel state, and the resulting impregnated structure is then removed from the trough 62. A conventional clean-up operation may then be performed, including removal of any resin radially outside of the release cloth layer 48. As discussed above, provision may be made for embedding ends 76 of wires into the resin, to protect the wires, and to retain the wires in fixed positions relative to the coils 50.

Figure 6:
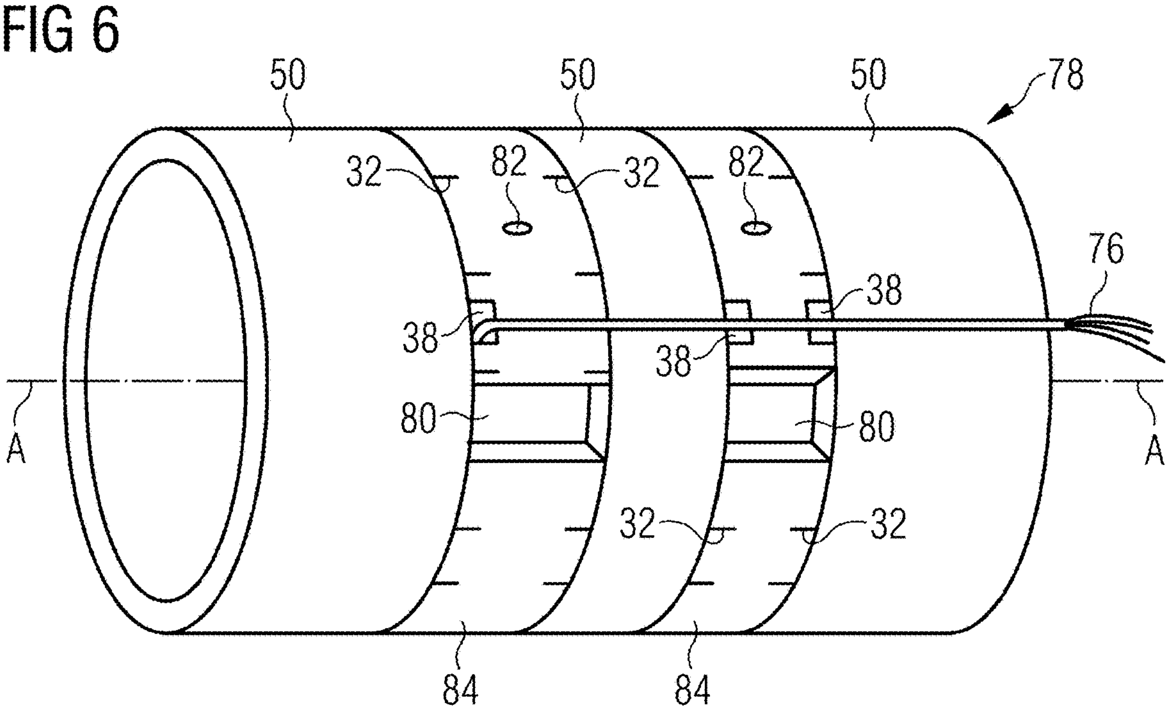
FIG. 6 illustrates a resin-impregnated superconducting coil structure that may result from a method, in accordance with one or more embodiments of the present disclosure.
Figure 7:
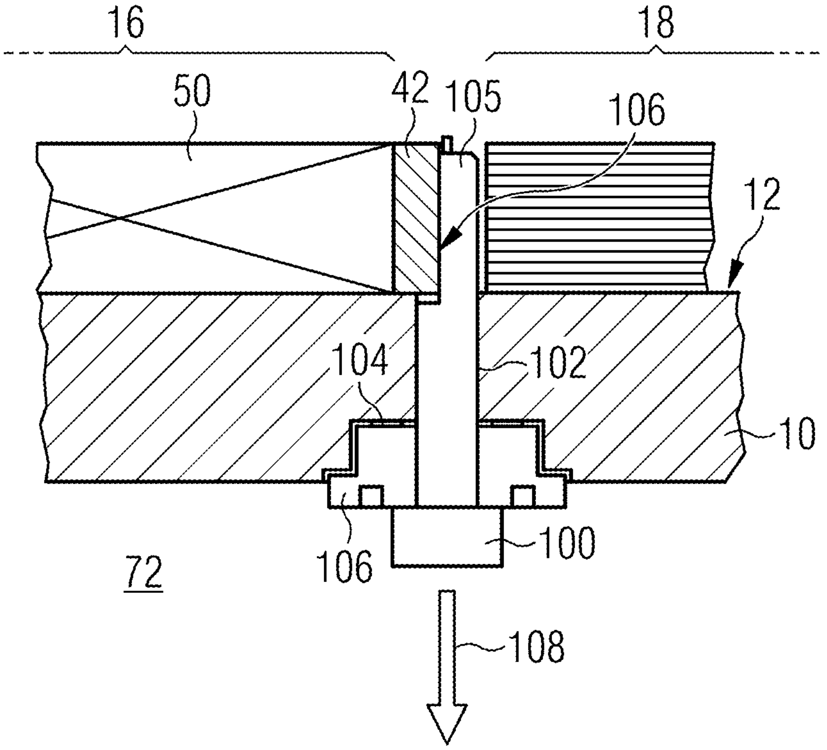
FIG. 7 illustrates an example use of retractable pins as an alternative to friable elements, in accordance with one or more embodiments of the present disclosure.

FIG. 6 shows an example resin-impregnated superconducting coil structure 78, as may result from a method of the present disclosure. As shown in FIG. 7, the resin-impregnated superconducting coil structure 78 has been removed from the mandrel. This may be achieved by a mechanical press. A force of several tons may be required to displace the mandrel 10 from the superconducting coil structure 78. Removal may be aided by the provision of a release coating such as PTFE on the radially outer surface 12 of the mandrel 10. Removal may be further aided by providing the mandrel 10 with a slightly conical outer surface 12. Such a taper should only be slight, so as not to significantly increase the size of the resulting resin-impregnated superconducting coil structure 78. For example, the taper may be one degree or less. As the mandrel is withdrawn, tabs 32 and any friable pins 39 or similar structures are sheared off at the shear plane S-S interface at the radially outer surface 12 of the mandrel 10. Resulting fragments of tabs 32, etc., should be removed from the mandrel 10 during a clean-up step. Experimentation may determine whether it is necessary to remove fragments of tabs 32 etc. from the structure 78, or whether these may be safely left in place.

The embodiment shown in FIG. 6 may be made by the method described above with dry loose filler material. Displacer blocks 40 were used, as discussed with reference to FIG. 1, and the presence of these spacer blocks has caused corresponding holes 80 in the finished structure. Such holes 80 reduce the mass of the resulting resin-impregnated superconducting coil structure 78, reduce the amount of material used, provide access to other parts of a cryostat into which the resin-impregnated superconducting coil structure 78 will eventually be mounted, and may provide some mechanical flexibility to enable the structure to better cope with coil expansion due to heating at quench, which in turn may allow higher coil temperatures and a simplified quench protection arrangement.

As discussed with reference to FIG. 6, the structure of the present disclosure may include dry loose filler material impregnated with resin to form composite filler material 84. Features 82, schematically represented in FIG. 7, may be threaded inserts, or other mechanical mounting means, which may be molded into the composite filler material 84 during the described process. Features 82 may be fitted to the mandrel 10, or to the interior of the wall of the trough 62 prior to molding, and in the finished structure may allow the mounting of shield coil support structures, termination parts, and other components. Such threaded inserts, or other features 82, may be mounted to the mandrel 10 by tabs 32 or friable pins 39 or similar prior to placing the structure into trough 62 for resin impregnation, as discussed with reference to FIG. 5.

Figure 8:
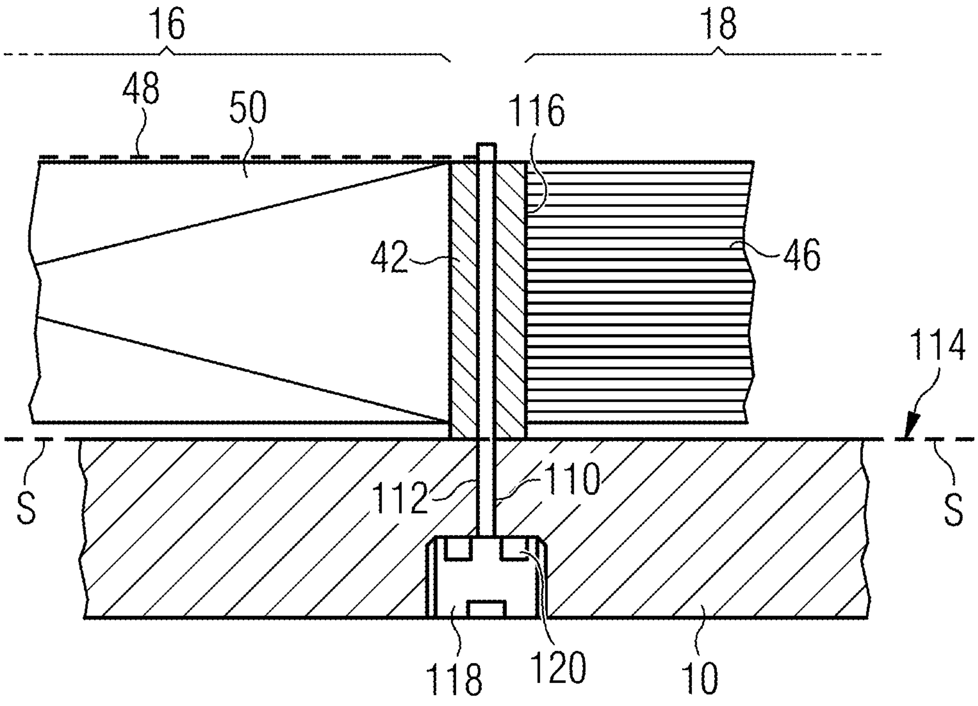
FIG. 8 illustrates an example use of shear pins that are incorporated into thin winding cheeks, in accordance with one or more embodiments of the present disclosure.

FIGS. 7 and 8 show alternative embodiments of the present disclosure, in which alternatives to friable tabs 32 are shown.

In the example of FIG. 7, the function of the friable tabs 32 as discussed with reference to FIGS. 1-4 is performed by retractable pins 100. In some embodiments, a combination of friable tabs 32 and retractable pins 100 may be implemented. In the example shown, retractable pin 100 passes from the bore 72 of the mandrel 10 through the material of the mandrel to emerge through the radially outer surface 12 at a required location. In the illustrated embodiment, a radially outer part 105 of the pin 100 in use is provided with an axially-directed flat surface 105, which in use may bear against a winding cheek 42 if provided, or may bear against turns of superconducting wire making up coil 50, when no winding cheeks are used. To ensure correct orientation of the axially-directed surface 106, the pin 100 may have a non-circular cross section, as may corresponding through-hole 102. To prevent leakage of resin through hole 102 during an impregnation step, a resilient seal 104 is provided. This may be an O-ring of suitable size, positioned around pin 100, and compressed into position by a threaded fitting 106.

Prior to and during resin impregnation, such as represented in FIG. 5, pins 100 function as described with reference to friable tabs 32. Once the impregnation step is complete, the pins 100 are then retracted or removed before the mandrel 10 can be removed from the superconducting coil assembly. Threaded fitting 106 may be removed or loosened, and pin 100 may be mechanically pulled in a radial direction 108 into bore 72, towards the axis A-A of the mandrel. A punch may be used on the radially outer end of the pin 100 to drive the pin from the hole 102, or a pulling tool may be used on a radially inner end of pin 100. In some embodiments, where through-hole 102 is of circular cross-section, the pin 102 may be threaded, and rotation of the pin 102 may be used to facilitate removal thereof. Once all pins 100 have been retracted or removed, the mandrel 10 may be withdrawn from the superconducting coil assembly as explained elsewhere.

In the completed superconducting coil assembly, holes will remain where pins 100 have been retracted or removed. These holes may be left unused, or may be implemented for example for mechanical mounting of components to the superconducting coil structure.

FIG. 8 illustrates another alternative to the friable tabs discussed above. Here, shear pins 110 are provided, through corresponding holes 112. Shear pins are intended to break at shear plane S-S 114 when mandrel 10 is withdrawn from the superconducting magnet assembly. Shear pins 110 may be scored or otherwise weakened at a location corresponding to the shear plane 114 to ensure that the pins 110 shear at the correct location when required. The shear pins may be implemented as cylinders, e.g. scored at a location intended to align with shear plane S-S.

As illustrated, shear pins 110 pass into a cavity or through-hole 116 formed in winding cheeks 42. By using winding cheeks as shown, pressure from winding of superconducting wire into coils 50 is spread over the surface of the winding cheeks and does not present points of high stress.

If the shear pins 110 are of suitable dimension and provided in suitable quantity, the shear pins may be used without the winding cheeks. The turns of wire making up coil 50 may then bear directly against shear pins 110. Protective tape may be used over the wire of the coil as it passes from one layer of turns to the next, to protect it from excessive pressure against the shear pins 110.

As with other embodiments of the present disclosure, superconducting wire is wound into regions 16 to form coils 50, while filler material is introduced into regions 18, either by winding a cloth of filler material, or by adding dry loose filler material into a mold containing the coils and mandrel, as described above.

When impregnation and molding of the resultant superconducting magnet coil structure is complete, mandrel 10 is withdrawn from the resulting resin-impregnated superconducting magnet coil assembly. The force required to withdraw the mandrel will, as with the tabs 32, cause the shear pins 110 to fracture at the shear plane S-S 114. Removable plugs 118 may be provided on the radially inner surface of mandrel 10, and may be removed after withdrawal of mandrel 10 from the superconducting coil structure to allow access to cavity 112 and so to facilitate removal of remains of the shear pins 110 from cavities 112. Seals 120 may be provided, and compressed between mandrel 10 and plug 118 to prevent leakage of resin through cavities or holes 112 during an impregnation step. Remains of shear pins 110 which lie within the winding cheeks 42 may be difficult to remove, and may be left in place.

Figure 9:
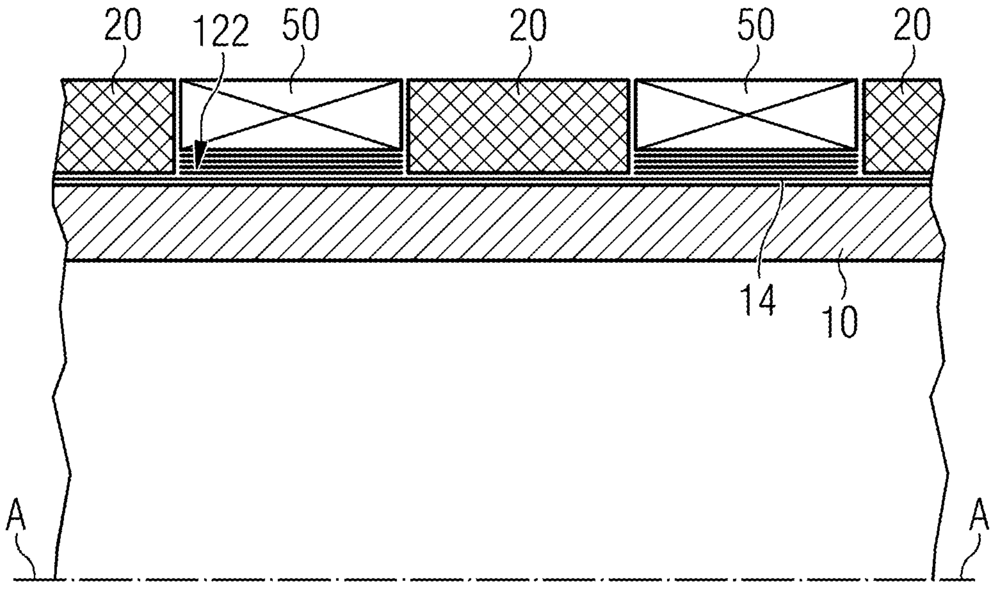
FIG. 9 shows an example in which layers of cloth are applied to the mandrel prior to winding of a coil, so as to increase the diameter of the coil without requiring a variance in the diameter of the mandrel, in accordance with one or more embodiments of the present disclosure.

FIG. 9 shows an example embodiment in which layers of cloth 122 are applied to the mandrel 10 prior to winding of a coil 50, so as to increase the diameter of the coil without requiring a variance in the diameter of the mandrel. The layers of cloth may be coated in uncured resin prior to winding onto the mandrel 10, a so-called "pre-preg" cloth, or may be wound dry and impregnated with resin during the same step that the coils are impregnated with resin. Similarly, the same effect may be achieved by winding a filament, or dry cloth, of glass fiber or similar, which may be coated with uncured resin prior to winding, or may be wound dry and impregnated with resin during the same step that the coils are impregnated with resin. Once the cloth or filament is wound to the required thickness over the mandrel, to provide the required inner diameter of the coil, wire is wound over the cloth or filament to constitute a superconducting coil, in the same manner as the other coils, as described above.

Manufacture of superconducting coil assemblies by the methods proposed in the present application may allow reductions in cost and time for manufacturing of resin-impregnated superconducting coil assemblies.

The methods of the present disclosure do not require expensive, finely machined composite rings, formers and sleeves, such as are employed in conventional methods. The elimination of finely machined rings saves significant material cost when manufacturing a superconducting magnet structure.

According to embodiments of the present disclosure, the superconducting coil structure may be molded, which enables the use of dry reinforcement material in the volumes between coils. These materials are much more cost-effective than the use of cured composites as is conventional.

In superconducting magnet assemblies according to the present disclosure, the cold mass, i.e. the equipment which is held at a cryogenic temperature below the relevant superconducting transition temperature, in use, can be optimized to reduce material cost, labor hours, manufacturing lead-time, and logistics costs.

What is claimed is:

1. A method for manufacturing a formerless, multi-coil cylindrical superconducting magnet structure, comprising:
- providing a mandrel;
- providing temporary locating features protruding from a radially outer surface of the mandrel to define axial sections, each one of the axial sections being respectively configured to carry superconducting coils and annular spacers of composite filler material;
- winding superconducting wire onto the mandrel in corresponding ones of the axial sections to form respective superconducting coils;
- placing an assembly comprising the mandrel, temporary locating features, and superconducting coils, into a molding tool;
- introducing a thermosetting resin into the molding tool to impregnate the superconducting coils and to provide a composite filler material in other corresponding ones of the axial sections to form annular spacers;
- removing from the molding tool a structure including (i) the formerless, multi-coil cylindrical superconducting magnet structure, and (ii) the mandrel; and
- removing the mandrel from the structure to provide the formerless, multi-coil cylindrical superconducting magnet structure.

2. The method according to claim 1, further comprising:
- removing the temporary locating features prior to the act of removing the mandrel.

3. The method according to claim 1, wherein the act of removing the mandrel causes the temporary locating features to shear at a shear plane.

4. The method according to claim 3, wherein the act of providing the temporary locating features comprises:
- partially inserting tabs of friable material into recesses in the radially outer surface of the mandrel.

5. The method according to claim 3, wherein the act of providing the temporary locating features comprises:
- partially inserting pins of friable material into holes in the mandrel.

6. The method according to claim 1, further comprising:
- providing winding cheeks that are supported axially by the temporary locating features,
- wherein the winding cheeks are configured to provide a continuous surface to define axial extremities of a winding cavity, into which the superconducting wire is wound to form the respective superconducting coils.

7. The method according to claim 1, wherein ends of wires forming the superconducting coils are led out from the superconducting coils in one or more cavities formed within a wall of the molding tool such that the ends of the wires are retained within a resin block, and
- wherein the resin block is formed by the introduction of the thermosetting resin such that the resin block is monolithically formed with the formerless, multi-coil cylindrical superconducting magnet structure.

8. The method according to claim 1, further comprising:
- attaching a displacer block to the radially outer surface of the mandrel over (i) a circumferential extent, and (ii) an axial extent that does not extend outside of an axial section configured to carry an annular spacer.

9. The method according to claim 1, further comprising:
- attaching a displacer block to a radially inner surface of the molding tool over (i) a circumferential extent, and (ii) an axial extent which does not extend outside of an axial section of the mandrel configured to carry an annular spacer.

10. The method according to claim 1, further comprising:
- forming annular spacers of composite filler material by winding strips of filler cloth around the mandrel into axial sections prior to the impregnation of the superconducting coils by the thermosetting resin,
- wherein the composite filler material is formed of the filler cloth impregnated with the thermosetting resin.

11. The method according to claim 1, further comprising:
- forming annular spacers of composite filler material by adding dry loose filler material into the molding tool prior to the impregnation of the superconducting coils by the thermosetting resin,
- wherein the composite filler material is formed of the dry loose filler material impregnated with the thermosetting resin.

12. A formerless, multi-coil cylindrical superconducting magnet structure, comprising:
- a set of superconducting coils, each one of the set of superconducting coils being formed by respective superconducting wires; and
- a composite filler material,
- wherein the multi-coil cylindrical superconducting magnet structure is formed by:
  - providing a mandrel;
  - providing temporary locating features protruding from a radially outer surface of the mandrel to define axial sections respectively configured to carry each one of the set of superconducting coils and annular spacers of the composite filler material;
  - winding the superconducting wires onto the mandrel in corresponding ones of the axial sections to form the set of superconducting coils;
  - placing an assembly comprising the mandrel, temporary locating features, and superconducting coils, into a molding tool;

introducing a thermosetting resin into the molding tool to impregnate the set of superconducting coils and to provide the composite filler material in other corresponding ones of the axial sections to form the annular spacers;

removing from the molding tool a structure including (i) the formerless, multi-coil cylindrical superconducting magnet structure, and (ii) the mandrel; and removing the mandrel from the structure.

* * * * *